Feb. 29, 1944.   R. H. GILL   2,343,143
ANCHOR RIVET
Filed Oct. 21, 1942
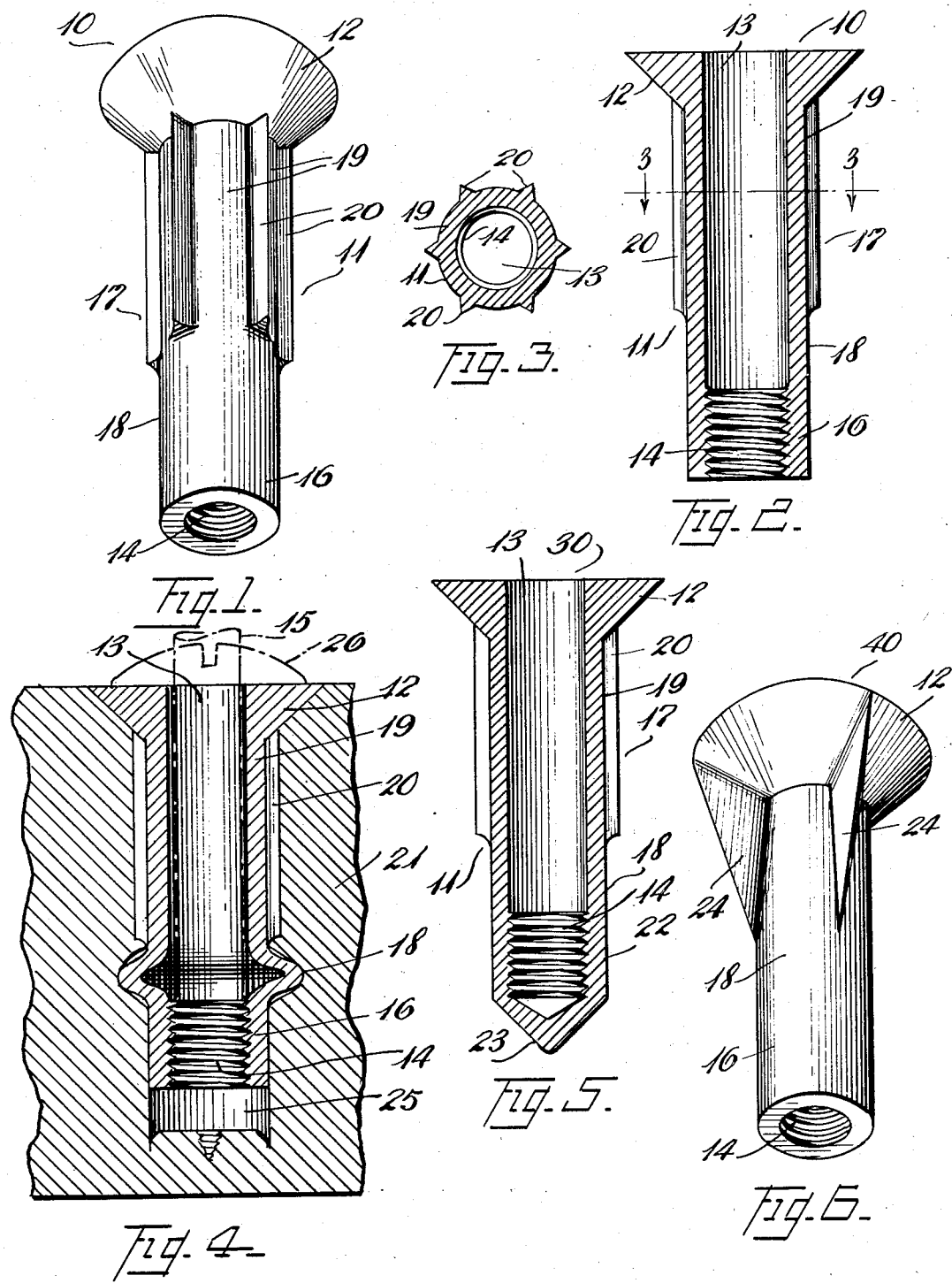
Inventor
Ray H. Gill
By Willis F. Amy Atty Patented Feb. 29, 1944

2,343,143

UNITED STATES PATENT OFFICE 2,343,143

ANCHOR RIVET

Ray H. Gill, Akron, Ohio, assignor to The B. F. Goodrich Company, New York, N. Y., a corporation of New York Application October 21, 1942, Serial No. 462,777

9 Claims. (Cl. 85—2.4)

This invention relates to rivets and is useful in blind riveting and especially for anchoring in apertures in bodies of deep material.

For some applications in the fastening of structures to bodies of non-metallic materials such as plastics, wood, and other fibrous materials, the prior expedients such as nail and screw fastening have in many cases been impractical, as, for example, where the material has been structurally weak or where the body has been subject to undue vibration. Also, where access has been possible only at one side of the work, and where the bodies have had walls of considerable depth, the problem has been aggravated.

Furthermore, prior nails and screw fasteners have not been entirely suitable for repeated attachment and detachment of the structures at the same position each time to the bodies; inasmuch as such fasteners have quickly lost their ability to reengage with the material once they have been removed from the aperture therein.

The principal objects of the invention are to provide effectively for anchoring a fastener in deep material; to provide an improved rivet-anchor for the purpose; to provide for expanding the wall of the rivet-body at a predetermined region while providing for resisting collapse of the wall of the remainder of the body; to provide for preventing rotation of the rivet in the aperture; to provide for repeated attachment and detachment of a structure to the body even though assembly can be effected from only one side of the wall of the body; and to provide for simplicity of construction and convenience of assembly and operation and manufacture.

These and other objects and advantages of the invention will be apparent from the following description.

In the accompanying drawing which forms a part of this specification, and in which like numerals are employed to designate like parts throughout the same, Fig. 1 is a perspective view of an anchor rivet constructed in accordance with and embodying the invention, Fig. 2 is a sectional view taken along the longitudinal axis of the rivet shown in Fig. 1, Fig. 3 is a sectional view taken along line 3—3 of Fig. 2, Fig. 4 is a view of the rivet anchored in an aperture in deep material, parts being in section, and a threaded tool for expanding the body of the rivet and an attaching screw being shown in dotted lines in the engaged position, Fig. 5 is a view like Fig. 2 showing a modification of the rivet, and Fig. 6 is a view like Fig. 1 showing a further modification of the rivet.

In the illustrative embodiment of the invention shown in Figs. 1 and 2, a rivet 10 capable of being anchored in an aperture in deep material 21, such as plastics, fiber board or wood, but which may also be used to secure thinner pieces of material together, comprises a continuously annular cylindrical body 11 having a flanged end 12 and a bore 13 extending therethrough, and may be made of aluminum or copper alloy, steel or other suitable material which is harder than the material which the rivet 10 engages but which is adequately ductile. For some applications a frusto-conical or countersunk shape of flanged end 12 as shown in Fig. 1, is preferable, but other shapes may be provided for other conditions of usage.

Preferably, the bore 13 is of substantially uniform diameter and terminates in an internally threaded portion 14 for engaging a threaded tool 15, as shown especially in Fig. 4. The bore 13 has a greater diameter than the threaded portion 14 to permit the tool 15 to slide into the rivet 10 from the flanged end 12, and to provide for greater wall thickness of the body 11 in the region of the threaded portion 14.

The cylindrical body 11 comprises an end portion 16 including the threaded portion 14 and a shank 17 including an expansible or outwardly collapsible portion 18 and a portion 19 having a plurality of circumferentially spaced-apart, integral, stiffening ribs 20 extending axially from the flange 12 to the expansible portion 18. The portion 16 has a flat, open end.

The stiffening ribs 20 extending axially along the portion 19 of the shank 17 are triangular in section and are adapted to bite into the material 21 when the rivet 10 is forced into the aperture. However, other desirable shapes, such as square and rectangular, may be used for stiffening and strengthening the wall of the portion 19, thus effectively preventing collapse of this portion of the wall while permitting expansion of the expansible portion 18. Also, when the rivet 10 is anchored in the aperture, as shown in Fig. 4, these ribs 20 are embedded in the material 21, hence preventing rotation of the rivet 10 during repeated engagement and disengagement of a threaded element 26 for attaching with the threaded end 16 of the rivet.

As an illustrative example of the operation of the rivet 10, a suitably sized aperture 25 is bored in deep material, for example, a wood beam, to an extent sufficient to accommodate the rivet. Prior to insertion of the rivet 10, the threaded tool 15 is inserted from the flanged end 12 of the rivet and engaged with the threaded end portion 16, after which the rivet 10 is inserted and driven into the aperture 25 until the flanged end 12 is flush with the surface of the wood. In this manner the stiffening ribs 20 are embedded in the wood hence preventing rotation of the rivet 10, when the tool 15 is disengaged and withdrawn, as well as when the rivet is engaged and disengaged subsequently by the threaded element 26. If desired, the rivet may be inserted in the aperture prior to engaging the tool with the rivet.

After the rivet 10 has been seated in the aperture 25, a suitable holding implement is positioned so as to retain the rivet in place while axial force is being applied to the tool 15 in a manner to cause expansion of the expansible portion 18 of the shank 16, while the stiffening ribs 20 prevent collapsing of the wall of the portion 19. When the portion 18 has been expanded into tight engagement with the material 21, the tool 15 is disengaged from the threaded end 16 and withdrawn from the bore 13 at the flanged end 12 of the rivet 10, the rivet now being anchored securely in the aperture 25.

A structure, such as a radio or an instrument cabinet, may be attached separably to a wall by means of a threaded element 26 engaging with the threaded end 16 of the rivet 10, and the rivet will not loosen nor rotate within the aperture during repeated engagements and disengagements of the threaded attaching element.

For some applications, such as in dense, hard material like oak, the embodiment 30 of Fig. 5 having a closed end 22 may be desirable. The closed end 22 may, if desired, have a tapered, rounded, flat, or other suitably shaped tip 23 for driving into the material 21. The aperture 25 in the material may be bored to a lesser depth than that required by the rivet 10. The rivet 30 is not engaged by the tool 15 prior to being inserted and driven into the aperture 25 such that the tapered driving tip 23 penetrates the wood. The resistance of the wood to penetration by the tip 23 causes the expansion of the expansible portion 18 thus anchoring the rivet 30 in the aperture 25, and the stiffening ribs 20 prevent collapsing of the wall of the portion 19 and prevent rotating of the rivet 30 in the aperture. If insufficient expansion of the expansible portion 18 is secured during the driving operation, the tool 15 may be engaged with the threaded end 22 and axial pressure applied, as described hereinabove, to complete the expansion to the desired extent for firmly anchoring the rivet 30 in the aperture 25. The tool is then disengaged from the rivet 30 and withdrawn from the bore 13 at the flanged end 12.

In the modified rivet 40 as shown in Fig. 6, stiffening ribs 24, preferably triangular in elevation and in section, extend axially along the frusto-conical flanged end 12 and continue along the portion 19 of the shank 17 to the expansible portion 18. Like the ribs 20 of the rivets 10 and 30, these stiffening ribs 24 limit the extent of the collapsing of the wall of the shank 17 to the outwardly collapsible portion 18 and prevent rotation of the rivet 40 within the aperture. The operation of applying the rivet 40 to the aperture in the material may be like that described hereinabove for the rivet 10, or in the case where the rivet 40 is to be used in thinner material, for example material of the depth of the ribs 24 a hole of the diameter of the portion 18 may be provided and the ribs may be forced into the material during the operation of upsetting the expansible portion as a result of the axial force on the rivet, thereby minimizing distortion of the material while providing a strong anchorage.

Variations may be made without departing from the scope of the invention as it is defined in the following claims.

I claim:

1. A fastener for anchorage in an aperture, said fastener comprising a body having a flange at one end and having a bore extending into the body from the flanged end, said body comprising an end portion opposite said flanged end and a shank intermediate said flanged end and said end portion, said shank including an expansible portion and a portion having stiffening means resisting collapse of its wall while permitting expansion of said expansible portion, said stiffening means being between said expansible portion and said flanged end, and means at said end portion for separably engaging the fastener with an engaging member inserted in the bore from said flanged end.

2. A rivet for anchorage in an aperture, said rivet comprising a body having a flange at one end and having a bore extending into the body from the flanged end, said body comprising an internally threaded end portion opposite said flanged end and a shank intermediate said flanged end and said threaded end portion, said shank including an expansible portion and a portion having stiffening elements extending along its wall for resisting collapse of said wall while permitting expansion of said expansible portion.

3. A rivet for anchorage in an aperture, said rivet comprising a body having a flange at one end and having a bore extending into the body from the flanged end, said body comprising an internally threaded end portion including a tapering driving tip opposite said flanged end and a shank intermediate said flanged end and said threaded end portion, said shank including an expansible portion and a portion having stiffening elements extending along its wall for resisting collapse of said wall while permitting expansion of said expansible portion.

4. A rivet for anchorage in an aperture, said rivet comprising a body having a flange at one end, said body having a bore extending into the body from the flanged end and terminating in an internally threaded portion, and said body having stiffening elements extending along said body from said flange for resisting collapse of the wall of the rivet and terminating short of said threaded portion providing an outwardly collapsible portion of the wall between said stiffening elements and said threaded portion.

5. A rivet for anchorage in an aperture in deep material, said rivet comprising a continuously annular cylindrical body of substantially uniform outside diameter throughout its length and a flange at one end, said body having a bore of substantially uniform diameter extending into the body from the flanged end and terminating in a threaded portion for engaging a threaded member inserted in the bore from the flanged end of the rivet, and said body including an expansible portion for embedding in said material and a portion having a plurality of circumferentially spaced-apart, stiffening elements extending axially short of the length of the body for resisting collapse of its wall while permitting expansion of said expansible portion.

6. A rivet for anchorage in an aperture in deep material, said rivet comprising a continuously annular cylindrical body having a flange at one end and having a bore of substantially uniform diameter extending therethrough, said body comprising an internally threaded end portion opposite said flanged end and a shank between said flanged end and said threaded end, said shank including an expansible portion adjacent said threaded end and a portion having a plurality of circumferentially spaced-apart, integral ribs triangular in section, said ribs extending axially along said portion from said flanged end for resisting collapse of its wall while permitting expansion of said expansible portion and for resisting rotation of the rivet in said aperture.

7. A rivet for anchorage in an aperture in deep material, said rivet comprising a continuously annular cylindrical body having a flange at one end and having a bore of substantially uniform diameter extending into the body from the flanged end and terminating in a threaded portion, said body comprising an end portion including said threaded portion and having a tapering driving tip and a shank connecting said flanged end and said end portion, said shank including an expansible portion adjacent said end portion and a portion having a plurality of circumferentially spaced-apart, integral ribs triangular in section, said ribs extending axially along said portion from said flanged end for resisting collapse of its wall while permitting expansion of said expansible portion and for resisting rotation of the rivet in said aperture.

8. A rivet for anchorage in deep material, said rivet comprising a body having a bore extending in said body from an end thereof, said body including a member-engaging portion spaced from said end, a shank having an expansible portion between said member-engaging portion and said end and having stiffening projections on said shank adjacent said expansible portion for limiting the extent of collapse of the wall of said shank to said expansible portion, and means at said member-engaging portion for separably engaging the rivet with an engaging member inserted in the bore from said end.

9. A rivet for anchorage in deep material, said rivet comprising a continuously annular cylindrical body having a bore extending in said body from an end thereof and terminating in an internally threaded portion, said body having a shank extending from said threaded portion toward said end, said shank including an expansible portion extending from said threaded portion toward said end, and circumferentially spaced-apart stiffening ribs extending axially along said shank from said expansible portion toward said end for resisting collapse of the wall thereof while permitting expansion of said expansible portion.

RAY H. GILL.